United States Patent
Mtauweg

(10) Patent No.: US 11,493,019 B2
(45) Date of Patent: Nov. 8, 2022

(54) WIND TURBINE ROTARY CONNECTION, ROTOR BLADE, AND WIND TURBINE COMPRISING SAME

(71) Applicant: Wobben Properties GmbH, Aurich (DE)

(72) Inventor: Samer Mtauweg, Bremerhaven (DE)

(73) Assignee: Wobben Properties GmbH, Aurich (DE)

( * ) Notice: Subject to any disclaimer, the term of this patent is extended or adjusted under 35 U.S.C. 154(b) by 366 days.

(21) Appl. No.: 16/308,240

(22) PCT Filed: May 31, 2017

(86) PCT No.: PCT/EP2017/063114
§ 371 (c)(1),
(2) Date: Dec. 7, 2018

(87) PCT Pub. No.: WO2017/211638
PCT Pub. Date: Dec. 14, 2017

(65) Prior Publication Data
US 2019/0170115 A1  Jun. 6, 2019

(30) Foreign Application Priority Data

Jun. 7, 2016 (DE) ..................... 10 2016 210 039.4

(51) Int. Cl.
*F03D 1/06* (2006.01)
*F03D 80/70* (2016.01)
(Continued)

(52) U.S. Cl.
CPC ......... *F03D 1/0658* (2013.01); *F03D 7/0204* (2013.01); *F03D 80/70* (2016.05);
(Continued)

(58) Field of Classification Search
CPC ..... F03D 1/0658; F03D 1/0675; F03D 1/0691
See application file for complete search history.

(56) References Cited

U.S. PATENT DOCUMENTS 4,474,529 A   10/1984  Kinsey
6,872,049 B2   3/2005  Christensen
(Continued)

FOREIGN PATENT DOCUMENTS

CN   102734060 A   10/2012
CN   102834611 A   12/2012
(Continued)

OTHER PUBLICATIONS

U.S. Appl. No. 16/304,581, filed Nov. 26, 2018, Wind Turbine.

*Primary Examiner* — Woody A Lee, Jr.
*Assistant Examiner* — Cameron A Corday
(74) *Attorney, Agent, or Firm* — Seed Intellectual Property Law Group LLP

(57) ABSTRACT

A wind power installation rotary connection, in particular a blade bearing or azimuth rotary connection, wherein the rotary connection is in the form of a plain bearing assembly, comprising an inner ring having a number of first plain bearing surfaces, an outer ring having a number of second plain bearing surfaces which are respectively associated with one of the first plain bearing surfaces as a plain bearing surface partner, and wherein the plain bearing assembly is in the form of a dry-running plain bearing assembly.

16 Claims, 4 Drawing Sheets

(51) Int. Cl.
*F16C 17/10* (2006.01)
*F03D 7/02* (2006.01)
*F16C 33/20* (2006.01)

(52) U.S. Cl.
CPC ............ *F16C 17/10* (2013.01); *F16C 33/203* (2013.01); *F05B 2230/60* (2013.01); *F05B 2240/221* (2013.01); *F05B 2240/50* (2013.01); *F05B 2260/79* (2013.01); *F05B 2280/2006* (2013.01); *F05B 2280/4005* (2013.01); *F05B 2280/4007* (2013.01); *F05B 2280/501* (2013.01); *F05B 2280/6003* (2013.01); *F16C 2360/31* (2013.01); *Y02E 10/72* (2013.01)

(56) References Cited

U.S. PATENT DOCUMENTS

| | | |
|---|---|---|
| 6,911,741 B2 | 6/2005 | Pettersen et al. |
| 8,164,211 B2 | 4/2012 | Numajiri |
| 8,222,759 B2 | 7/2012 | Loeschner et al. |
| 8,840,521 B2 | 9/2014 | Kari et al. |
| 8,912,680 B2 | 12/2014 | Gelmini et al. |
| 8,937,397 B2 | 1/2015 | Gelmini |
| 8,937,398 B2 | 1/2015 | Casazza et al. |
| 8,957,555 B2 | 2/2015 | Pabst et al. |
| 8,975,770 B2 | 3/2015 | Gelmini |
| 9,006,918 B2 | 4/2015 | Casazza et al. |
| 9,145,869 B2 | 9/2015 | Thomsen et al. |
| 9,279,413 B2 | 3/2016 | Ebbesen et al. |
| 9,394,887 B2 | 7/2016 | Roer et al. |
| 9,689,174 B2 | 6/2017 | Gotfredsen |
| 10,094,419 B2 | 10/2018 | Mtauweg et al. |
| 2010/0244454 A1 | 9/2010 | Loeschner et al. |
| 2011/0188988 A1* | 8/2011 | Wadehn ................ F03D 80/70 415/1 |
| 2011/0311362 A1 | 12/2011 | Corts |
| 2012/0228878 A1 | 9/2012 | Perner et al. |
| 2012/0263598 A1* | 10/2012 | Thomsen ............... F03D 80/70 416/205 |
| 2013/0071246 A1 | 3/2013 | Kari et al. |
| 2014/0161614 A1* | 6/2014 | Vervoorn .............. F03D 1/0658 416/148 |
| 2014/0169952 A1 | 6/2014 | Pedersen et al. |
| 2014/0193264 A1 | 7/2014 | Pedersen et al. |
| 2014/0321781 A1 | 10/2014 | Pedersen et al. |
| 2015/0017000 A1 | 1/2015 | Sato et al. |
| 2015/0047270 A1 | 2/2015 | Gotfredsen |
| 2015/0148271 A1 | 5/2015 | Golob et al. |
| 2015/0192110 A1 | 7/2015 | Pedersen |
| 2015/0244221 A1 | 8/2015 | Canini |
| 2015/0330367 A1 | 11/2015 | Homsy et al. |
| 2015/0369284 A1 | 12/2015 | Hager et al. |
| 2017/0067450 A1 | 3/2017 | Kumar |
| 2017/0082141 A1 | 3/2017 | Mtauweg et al. |
| 2017/0307008 A1* | 10/2017 | Heege .................... F16C 35/042 |
| 2019/0145378 A1 | 5/2019 | Knoop et al. |

FOREIGN PATENT DOCUMENTS

| | | |
|---|---|---|
| CN | 104583621 A | 4/2015 |
| DE | 10255745 A1 | 6/2004 |
| DE | 202007002609 U1 | 5/2008 |
| DE | 102009053879 A1 | 5/2011 |
| DE | 102013004339 A1 | 9/2014 |
| DE | 102014205637 A1 | 10/2015 |
| EP | 2511521 A1 | 10/2012 |
| EP | 2568167 A1 | 3/2013 |
| EP | 2568168 A1 | 3/2013 |
| JP | H0819284 B2 | 2/1996 |
| JP | 2006118552 A | 5/2006 |
| JP | 2006-312688 A | 11/2006 |
| KR | 20100021558 A | 2/2010 |
| RU | 19886 U1 | 10/2001 |
| RU | 2280786 C2 | 7/2006 |
| RU | 118701 U1 | 7/2012 |
| RU | 2558401 C2 | 8/2015 |
| WO | 2011/127509 A1 | 10/2011 |
| WO | 2013182583 A1 | 12/2013 |
| WO | 2013191163 A1 | 12/2013 |
| WO | 2016055391 A1 | 4/2016 |

\* cited by examiner

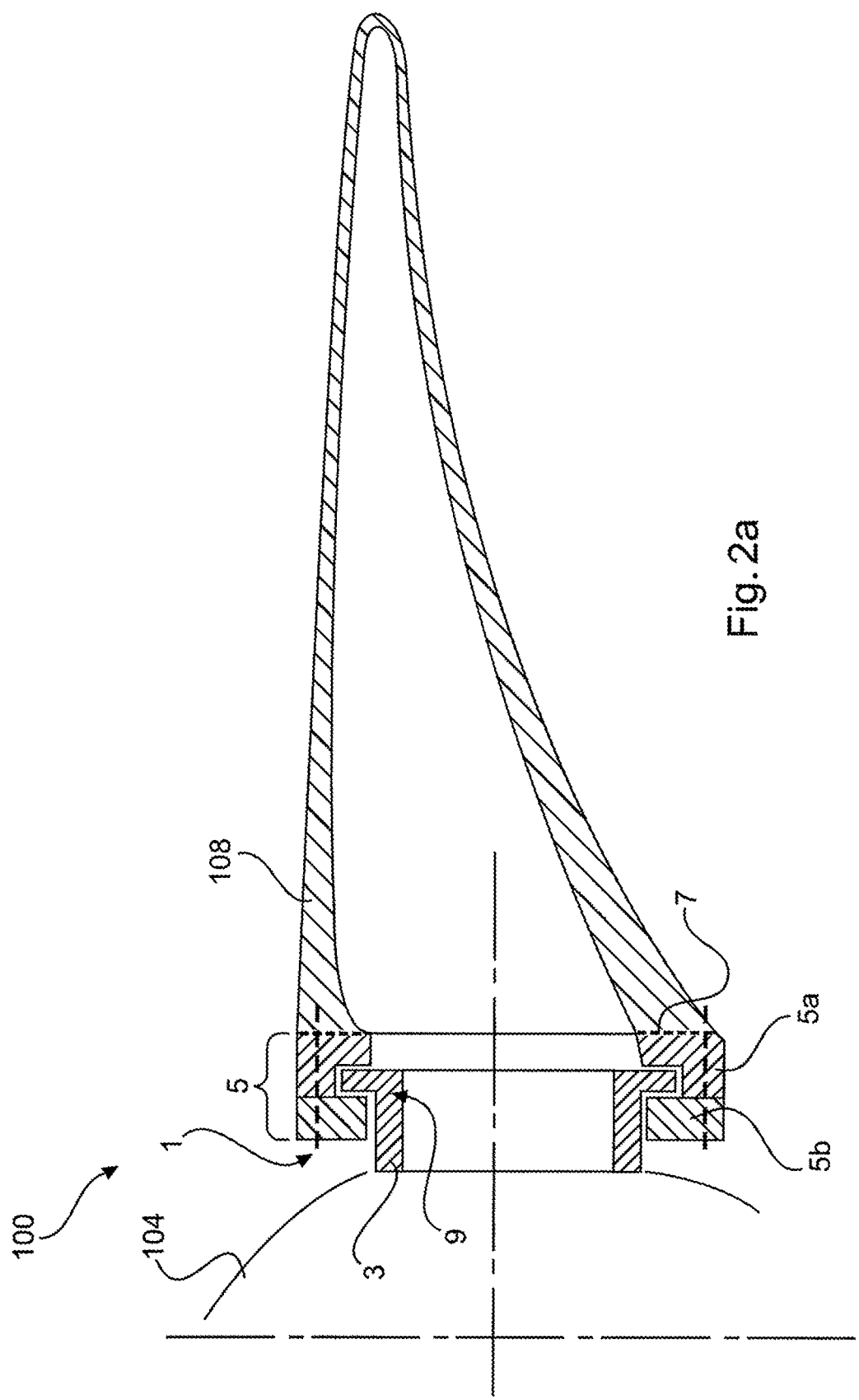

WIND TURBINE ROTARY CONNECTION, ROTOR BLADE, AND WIND TURBINE COMPRISING SAME

BACKGROUND

Technical Field

The present invention concerns a wind power installation rotary connection, in particular a blade bearing or azimuth rotary connection. The invention further concerns a wind power installation rotor blade and a wind power installation.

Description of the Related Art

Wind power installations are generally known. At various functional locations they have rotary connections in order for example at the azimuth bearing to be able to pivot the pod relative to the pylon of the wind power installation, or to be able to set the angle of incidence of the rotor blade with respect to the wind relative to the rotor hub with a pitch drive. For that purpose the respective components of the wind power installation are mounted rotatably to each other with rotary connections. By virtue of the high loads involved, in the state of the art recourse is usually made to rolling bearing assemblies which respectively consisted of ball bearings or torque bearings in the form of a single-row or multi-row bearing assembly or a combination of axial and radial bearings. Irrespective of the generally satisfactory mechanical efficiency of those kinds of bearings rolling bearings require a certain structural size and without exception are of comparatively high weights so that there was a need for improvement in respect structural size and weight in regard to the known wind power installations, their rotary connections and the components having the rotary connections like for example the pods or rotor blades of the wind power installations.

BRIEF SUMMARY

A rotary connection is the term used to denote any rotationally moveable mounting of two parts relative to each other, including but not exclusively consisting of support bearings, fixed/free bearings, torque bearings and so forth. Provided are improved wind power installation rotary connections referred to in the opening part of this specification. Improvements may refer to its weight and structural space and in that respect to adversely affect the load-bearing capacity to the slightest possible degree.

Provided is a wind power installation rotary connection which in particular is a blade bearing or azimuth rotary connection is in the form of a plain bearing assembly, having an inner ring with a number of first plain bearing surfaces, an outer ring with a number of second plain bearing surfaces which are respectively associated with one of the first plain bearing surfaces as a plain bearing surface partner, wherein the plain bearing assembly is in the form of a dry-running plain bearing assembly. The approach adopted is that a plain bearing assembly allows a markedly smaller structural space and a structure which is substantially more weight-saving, than a conventional rolling bearing assembly. It has surprisingly been found that dry-running plain bearing assemblies are highly suitable as a wind power installation rotary connection, in particular as a blade bearing or azimuth rotary connection.

An advantageous development provides that, in the case of one of the rings, preferably the inner ring, one, more or all of the plain bearing surfaces are in the form of metallic plain bearing surfaces. For that purpose the metallic surface is preferably of a roughness $R_a$ of less than 1.0 μm, preferably 0.8 μm or less.

The metallic material used is preferably brass, a brass alloy, white metal, for example lead, tin, antimony, bismuth, copper, a copper alloy, in particular a copper lead casting alloy, a bronze casting alloy, in particular lead bronze, a lead bronze casting alloy, a lead-tin casting alloy, aluminium, an aluminium alloy, in particular an aluminium tin casting alloy, an aluminium zinc casting alloy, steel, a steel alloy, a sintered metal or a combination of a plurality of the above-mentioned metallic materials.

As an alternative to a purely metallic material a metal composite material is preferably used, for example a ceramic-metallic composite material (cermet) or a metal-plastic composite material.

Alternatively preferably an in particular non-metallic material is used for the plain bearing surfaces, like for example sintered ceramic (which can have for example metal oxides as a constituent), a high-performance plastic like for example a thermoplastic high-performance polymer, in particular an amorphous thermoplastic high-performance polymer, for example polyamidimide (PAI), possible with a graphite and/or PTFE additive. Further preferably in the case of the respective other ring, preferably the outer ring, one, more or all of the number of plain bearing surfaces is partially or completely formed from a fiber composite material. The plain bearing surface consisting of or having fiber composite material enjoys surprisingly good dry-running capability and is therefore surprisingly wear-resistant. In particular a high degree of impact and shock compatibility is achieved, together with a low level of sensitivity in relation to edge loadings. By virtue of the good dry-running properties it is possible to dispense with the use of lubricant like for example grease or oil. By virtue of the use of the fiber composite material the plain bearing assembly is high resistant to corrosive media and has improved vibration damping values in comparison with purely metallic rotary connections. It is precisely the reduction in vibrations that is an aspect of ever increasing importance in the construction of wind power installations as sound emission guidelines of ever increasing strictness are becoming important worldwide.

The plain bearing surfaces, in particular those of that ring whose plain bearing surfaces are partially or completely made of a fiber composite material are preferably of a segmented configuration so that easier and faster maintenance of the rotary connection can take place in the pod.

In a preferred development of the rotary connection a number of plain bearing layers comprising a respective one of the following materials is applied to one, more or all plain bearing surfaces: polytetrafluoroethylene, expanded polytetrafluoroethylene, molybdenum disulphide, graphite, graphene, or a combination of a plurality of those materials. If non-metallic materials are used for the plain bearing surfaces preferably a number of the plain bearing layers is made from a vapor-deposited metallic material.

Insofar as reference is made to a "number" in the context of this invention that is used to denote the number 1 and an integral multiple thereof. In preferred embodiments the fiber material for the fiber composite material is a material selected from the list consisting of: carbon fibers, glass fibers, steel fibers, bamboo fibers or a combination of a plurality of those materials.

Preferably the fiber composite material is in woven form and embedded in a matrix material, wherein the matrix material is in particular a thermoplastic material or a thermosetting material, in particularly epoxy resin.

The inner ring and the outer ring in a particularly preferred embodiment of the rotary connection each have a radial bearing surface and two axial bearing surfaces. The radial bearing surfaces of the outer and inner rings are oriented in mutually facing relationship to provide a radial bearing while the respective one axial bearing surface of the inner ring is oriented towards a corresponding axial surface of the outer ring to form an axial thrust bearing.

In a further particularly preferred embodiment the ring, preferably the outer ring, having the base layer of fiber composite material, is of a two-part or multi-part structure insofar as the radial plain bearing surface and a first axial plain bearing surface are provided at a first body portion and the second axial plain bearing surface or one or more further plain bearing surfaces is or are provided at a second body portion or one or more further body portions. Preferably then the second body portion or the further body portion or portions is in the form of a one-part or multi-part flange disc, wherein the first and second body portions can be coupled together, preferably reversibly releasably, at mutually corresponding ends. In practice for example screw connections have proven to be reliable as the reversibly releasable connections. For screwing purposes preferably one of the body portions, for example the first body portion, has metal inserts for receiving screw threads so that the fiber composite material is not damaged by the sharp-edged screw flights.

In a preferred embodiment the inner ring and the outer ring respectively have one or more mutually corresponding angled bearing surfaces, preferably bearing surfaces angled in opposite directions.

An embodiment was described hereinbefore by means of a first aspect concerning the rotary connection in isolation. The invention provides its advantages in particular also in relation to a wind power installation rotor blade. Provided is a wind power installation rotor blade which can be connected to a hub of the wind power installation by means of a rotary connection, wherein the rotary connection is in accordance with one of the above-described preferred embodiments. In regard to the technical effect and advantages attention is directed in this respect to the foregoing description.

A rotor blade is particularly preferred in which the outer ring of the rotary connection has one, more or all of the number of plain bearing surfaces of fiber composite material, and is of an at least two-part structure insofar as the radial plain bearing surface and a first plain bearing surface are provided at a first body portion and the second axial plain bearing surfaces is provided at a second body portion, wherein the first body portion is provided integrally on the rotor blade. That is preferably achieved in that the first body portion and with same the first axial plain bearing surface and a radial plain bearing surface are provided on the rotor blade in the production thereof. In particular when the rotor blade also comprises fiber composite material the corresponding fiber mats for the first body portion of the outer ring are preferably also laid out therewith and embedded jointly with the fabric mats of the rotor blade in the matrix material so that the result is a "monolithically" acting overall structure at which the plain bearing surfaces of the first body portion of the outer ring are provided.

In preferred embodiments the rotary connection is an azimuth bearing assembly. Preferably the azimuth bearing assembly is in a segmented form, the individual plain bearing surfaces being in the form of dedicated segments. Particularly preferably the segments are made from a coated fiber composite material, for example glass fiber-reinforced plastic. The segments are preferably mounted on a metallic ring and a counterpart thereto is in the form of a metallic bearing ring or a bearing surface on a metallic pylon head flange so that the segments slide on the bearing ring, for example during wind direction tracking. Alternatively preferably the segments are mounted on a metallic ring or directly on the pylon head flange and the metallic bearing ring is mounted to the machine carrier and slides on the segments.

The invention further concerns a wind power installation as referred to in the opening part of this specification. Provided is a wind power installation insofar as it proposes a wind power installation having a pylon on which a pod is mounted by means of a first rotary connection, wherein provided at the pod is a rotor hub having one or more rotor blades fixed to the rotor hub to drive a generator, wherein the rotor blades are adjustable in their angle of incidence in particular by means of a pitch drive and are mounted to the rotor hub by means of a second rotary connection. In particular it is proposed that the rotary connection is in accordance with one of the above-described preferred embodiments. Particularly preferably in such a wind power installation the rotor blade or blades is or are according to one of the above-described preferred embodiments.

BRIEF DESCRIPTION OF THE SEVERAL VIEWS OF THE DRAWINGS

The invention is described in greater detail hereinafter with reference to the accompanying Figures in which:

FIG. 2a shows a diagrammatic detail view relating to the wind power installation of FIG. 1.

DETAILED DESCRIPTION

Figure 1:
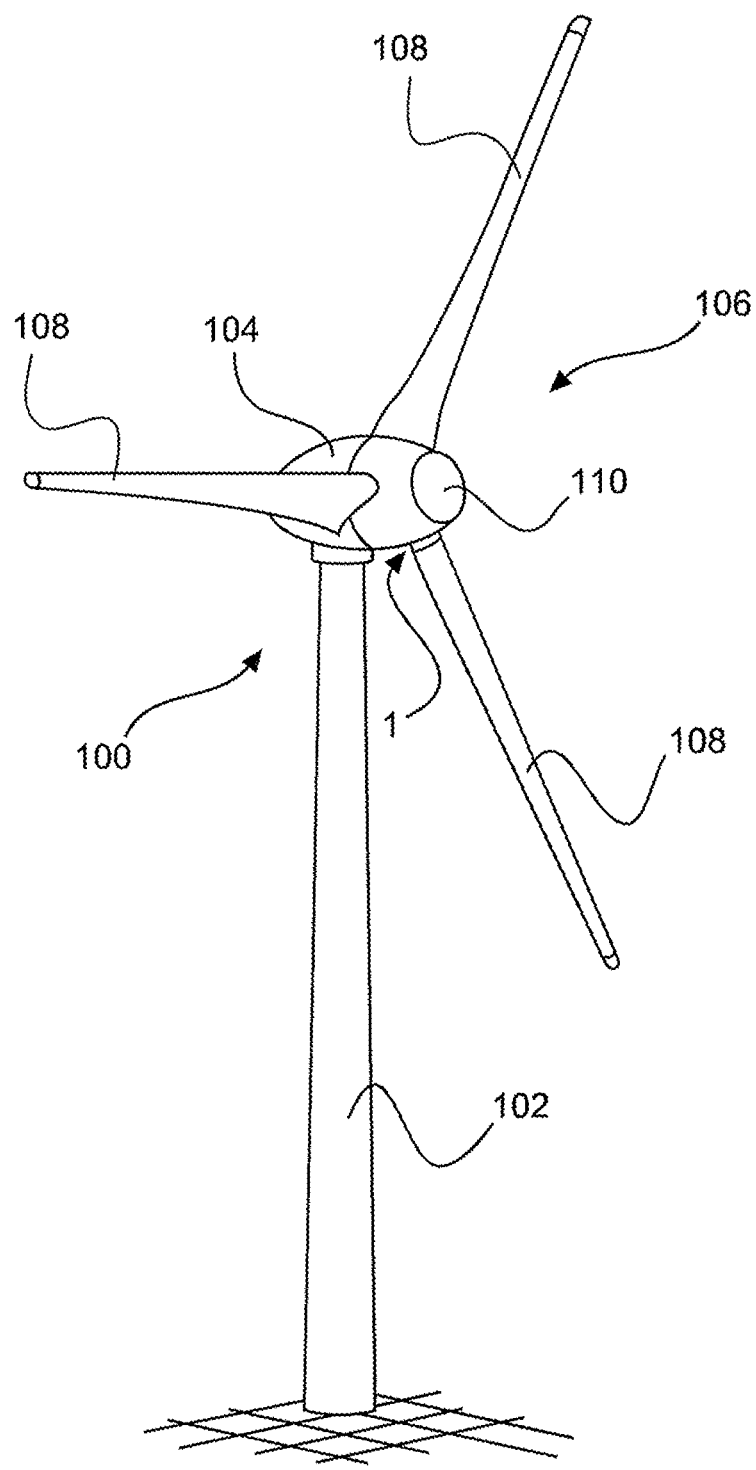
FIG. 1 shows a diagrammatic perspective view of a wind power installation according to the present invention.

FIG. 1 shows a diagrammatic view of a wind power installation according to the invention. The wind power installation 100 has a pylon 102 and a pod 104 on the pylon 102. Provided at the pod 104 is an aerodynamic rotor 106 having three rotor blades 108 and a spinner 110. In operation of the wind power installation 100 the aerodynamic rotor 106 is caused to rotate by the wind and thus also rotates a rotor or rotor member of a generator which is directly or indirectly coupled to the aerodynamic rotor 106. The generator is preferably a slowly rotating synchronous generator. The generator is arranged in the pod 104 and generates electric power. The pitch angles of the rotor blades 108 can be altered by pitch motors at the rotor blade roots of the respective rotor blades 108. A rotary connection 1 is provided for mounting the rotor blades 108 relative to the rotor hub provided on the pod 104.

Figure 2B:
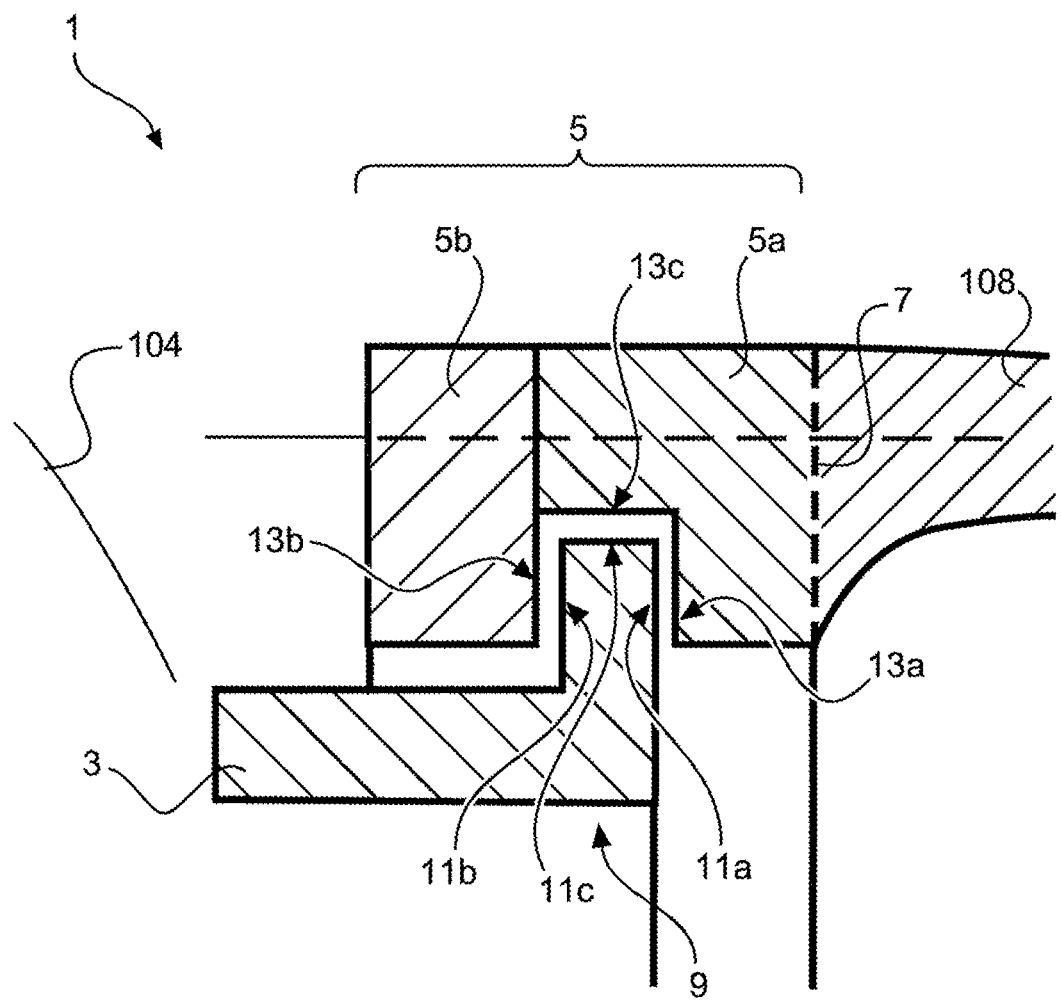
FIG. 2b shows a further detail view of the illustration of FIG. 2a, FIG. 3 shows a further diagrammatic detail view relating to the wind power installation of FIG. 1.

The rotary connection 1 is shown more fully with its functional and structural details in FIGS. 2a and 2b.

The rotary connection 1 has an inner ring 3 and outer ring 5. In the present embodiment the inner ring 3 is arranged fixedly on the pod 104 and the outer ring 5 on the rotor blade 108. Optionally the outer ring 5 is provided as a separate component and fixed to the rotor blade 108 at a corresponding end, see the separation line 7. In accordance with another preferred option the outer ring 5 is produced as a two-part component. A first body portion 5a of the outer ring 5 is provided integrally on the rotor blade 108, particularly preferably that already being effected during production of the rotor blade 108.

A second portion 5b is in the form of flange-like disc, optionally of a segment-like configuration, and is fixed releasably to the first body portion 5a of the outer ring 5. An annular gap is defined between the body portions 5a, 5b of the outer ring 5, with a flange-like projection 9 of the inner ring 3 fitting in the annular gap.

Provided on the flange-like projection line of the inner ring 3 are a first and a second axial plain bearing surface 11a, 11b and a third plain bearing surface 11c which is arranged between the first and second axial plain bearing surfaces 11a, 11b and which is a radial plain bearing surface.

Disposed in respective mutually opposite relationship the outer ring 5 has a first and a second axial plain bearing surface 13a, 13b and a radial plain bearing surface 13c which with the corresponding oppositely disposed plain bearing surface 11a, 11b, 11c form a plain bearing assembly. The plain bearing assembly of the rotary connection 1 is a dry-running bearing assembly. That is used to mean in particular that there is no lubricant like for example grease or oil in the bearing gap.

The dry-running bearing assembly enjoys its advantage in particular in relation to small pivotal amplitudes and low rotational speeds. In that range of movement the dry-running properties and along therewith the resistance to wear of the rotary connection 1 are surprisingly good.

The outer ring is preferably made partially or completely from a fiber composite material like for example glass fiber-reinforced plastic. A thermosetting epoxy resin is particularly preferred as the plastic. Preferably one or more layers of an adhesion-reducing material, for example (expanded) polytetrafluorethylene ((e)PTFE) are applied at the surface of the plain bearing surface 13a, 13b, 13c and/or at the surfaces of the plain bearing surfaces 11a, 11b, 11c. The inner ring 3 is preferably produced at least in the region of the flange-like projection line, but preferably completely, from a metallic material. The surface roughness is preferably less than 1.9 µm $R_a$, particularly preferably less than 0.8 µm $R_a$.

The concept of the rotary connection was set forth in present FIGS. 2a and 2b by means of a rotary connection for a pitch bearing of a rotor blade 108 on the pod 104. The concept can also be implemented on a rotary connection in the form of an azimuth bearing between the pylon 102 and the pod 104. In the case of such a pylon (not shown) preferably one of the bearing rings is also made from a metallic material while the respective other bearing ring is made from a one-part or multi-part ring partially or completely comprising fiber composite material. In that respect attention is directed to its full extent to the foregoing specific description and to the preferred embodiments described hereinbefore.

Figure 3:
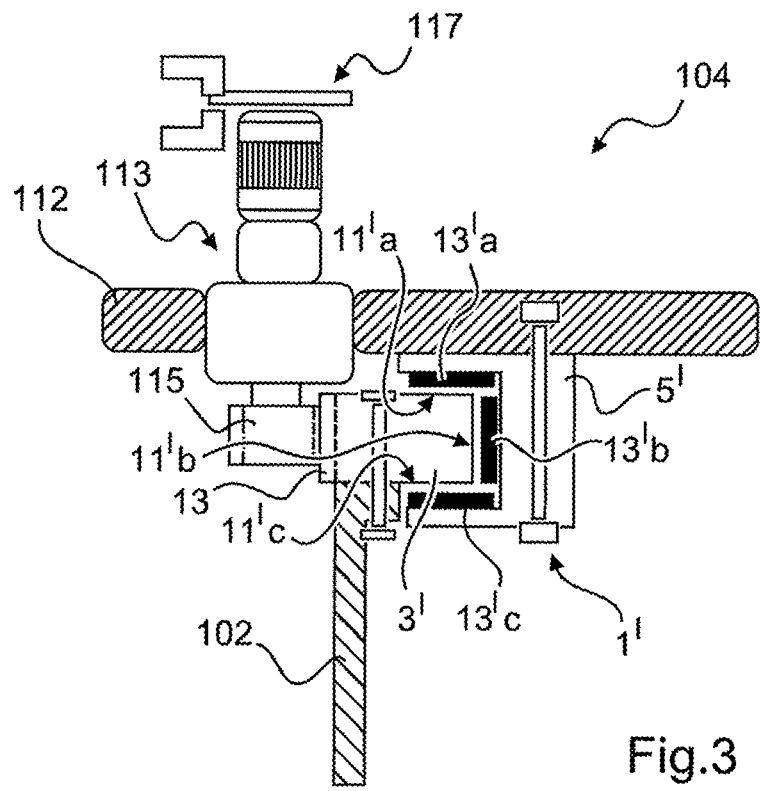

With reference to foregoing FIGS. 1 and 2a, 2b the invention was described primarily on the basis of a blade bearing assembly. As already mentioned in the opening part of this specification however the invention also concerns other rotary connections like for example the azimuth bearing assemblies shown in FIGS. 3 and 4. FIG. 3 shows a portion of a pod 104 of the wind power installation 100 (FIG. 1). The wind power installation 100 has a machine carrier 112 in the pod 104. Provided on the machine carrier 112 is a drive motor 113 for adjusting the angular orientation of the pod 104 relative to the pylon 102. The drive motor has a drive pinion 115 meshing with a tooth arrangement 15 and a rotary connection 1'. The tooth arrangement 15 is provided on a bearing ring 3' which is preferably an inner ring. The first bearing ring 3' is preferably partially or completely made from a metallic material or from one of the preferred above-described materials. The first bearing ring 3' has three plain bearing surfaces 11'a, 11'b, 11'c.

The rotary connection 1' further has a second bearing ring 5'. Unlike the bearing ring 5 shown in FIGS. 2a, 2b the second bearing ring 5' is made of a metallic material in respect of its base structure and has two axial plain bearing surfaces 13'a, 13'c and a radial plain bearing surface 13'b which preferably comprise a fiber-reinforced plastic and optionally have one or more layers of an adhesion-reducing material. Alternatively or additionally one or more layers of an adhesion-reducing material in accordance with the above-described preferred embodiments are applied to the surface portions of the plain bearing surfaces 11'a, 11'b, 11'c. The plain bearing surfaces 11'a, 11'b, 11'c and 13'a, 13'b, 13'c respectively form a sliding bearing with each other.

Figure 4:
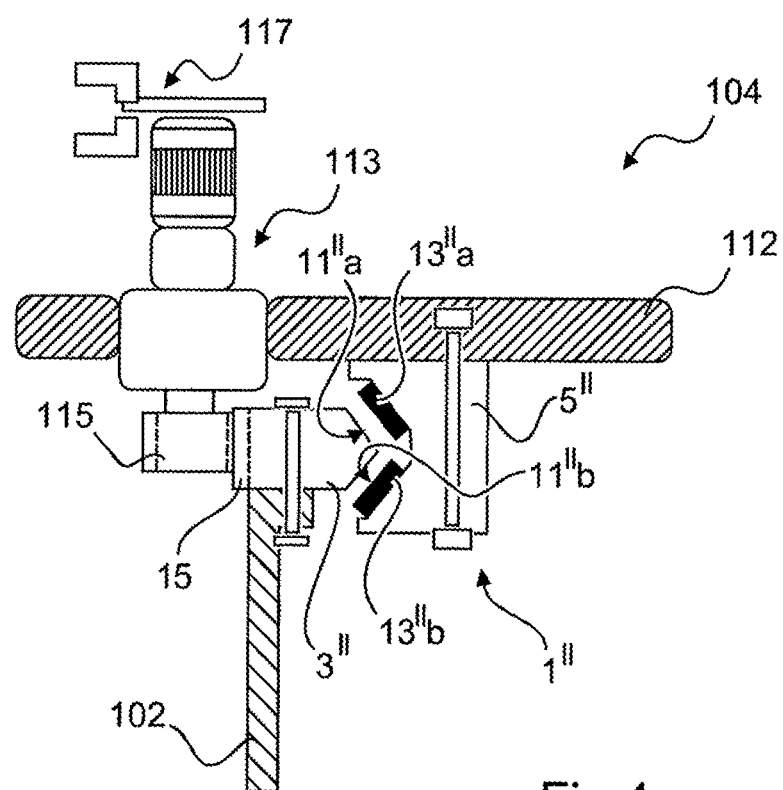
FIG. 4 shows an alternative configuration in relation to the embodiment of FIG. 3.

FIG. 4 shows a slightly different alternative configuration of an azimuth bearing assembly in the form of a rotary connection 1". Like the rotary connection 1' shown in FIG. 3 the rotary connection 1" serves for rotation of the machine carrier 112 or the pod 104 relative to the pylon 102 of the wind power installation 100 (FIG. 1). Unlike the embodiment of FIG. 3 a first bearing ring 3" which is preferably an inner ring has not three but only two plain bearing surfaces 11"a, 11"b which are not oriented strictly radially or axially but are each angled. Depending on whether the illustrated configuration shows the first bearing ring 3" as the inner ring or the outer ring, the illustrated plain bearing assembly would be an X- or O-bearing assembly.

In addition to the first bearing ring 3" the rotary connection 1" shown in FIG. 4 has a second bearing ring 5" at which two plain bearing surfaces 13"a, 13"b are arranged corresponding to the first bearing ring 3". Preferably the second bearing ring 5" is made from a metallic material while the plain bearing surfaces 13"a, 13"b are in the form of preferably segmented elements of a fiber composite material like for example glass fiber-reinforced plastic. Regarding surface roughness and coating preferably that which was described hereinbefore for the foregoing embodiments and preferred embodiments also applies here.

FIGS. 3 and 4 in identical fashion show a motor brake 117 which is used in known manner to brake or stop a rotary movement of the pod 104 relative to the pylon 102.

Both the embodiment of FIG. 3 and also the embodiment of FIG. 4 can have a rotary connection 1',1" which is disposed inwardly relative to the pylon 102 or a rotary connection 1',1" which is disposed outwardly. The terminology relating to the inner and outer rings is then respectively correspondingly interchanged.

The invention claimed is:
1. A wind power installation, comprising:
a rotor hub; and
a rotor blade coupled to the rotor hub by a rotary connection, wherein the rotary connection is a dry-running plain bearing assembly, the rotary connection comprising:
an inner ring having one or more first plain bearing surfaces; and
an outer ring having one or more second plain bearing surfaces, each of the one or more second plain bearing surfaces being associated with a respective one of the one or more first plain bearing surfaces to form a plain bearing surface partner, wherein at least one of the one or more second plain bearing surfaces include a fiber composite material, and wherein the outer ring of the rotary connection includes a first body portion and second body portion, wherein the first body portion is integrally formed with the rotor blade such that fiber mats of the first body portion and the rotor blade are embedded jointly in a common matrix material, the second body portion being coupled to the first body portion, the first body portion forming at least one of the one or more second plain bearing surfaces.

2. The wind power installation according to claim 1 wherein at least one of the plain bearing surfaces of at least one of the inner ring or the outer ring is partially or completely made from a fiber composite material.

3. The wind power installation according to claim 1 wherein the one or more plain bearing surfaces of the inner ring or the outer ring includes:
   polytetrafluorethylene,
   expanded polytetrafluorethylene,
   molybdenum disulphide,
   graphite,
   graphene,
   vapor-deposited metallic material, or
   a combination of two or more of the above materials.

4. The wind power installation according to claim 2 wherein the fiber composite material includes:
   carbon fibers,
   glass fibers,
   steel fibers,
   bamboo fibers, or
   a combination of two or more of the above fibers.

5. The wind power installation according to claim 2, wherein the fiber composite material of the plain bearing surface of the outer ring are the fiber mats and are embedded in the common matrix material.

6. The wind power installation according to claim 1 wherein the inner ring and the outer ring each have a radial bearing surface and first and second axial bearing surfaces.

7. The wind power installation according to claim 6 wherein the radial plain bearing surface of the outer ring and the first axial plain bearing surface of the outer ring are part of the first body portion and the second axial plain bearing surface part of the second body portion.

8. The wind power installation according to claim 1 wherein the second body portion is a multi-part flange disc, and wherein the first and second body portions are configured to be coupled together.

9. The wind power installation according to claim 1 wherein the inner ring and the outer ring, respectively, have one or more mutually corresponding angled bearing surfaces.

10. The wind power installation according to claim 1 wherein the rotary connection forms an azimuth bearing assembly.

11. The wind power installation according to claim 1, further comprising:
    a pylon; and
    a pod mounted to the pylon, wherein rotor hub is coupled to the pod.

12. The wind power installation according to claim 9 wherein the one or more first and second plain bearing surfaces of the inner and outer rings are made from the fiber mats.

13. The wind power installation according to claim 1 wherein the wind power installation rotary connection is a blade bearing or an azimuth rotary connection.

14. The wind power installation according to claim 1 wherein the matrix material is at least of: a thermoplastic material, a thermosetting material, or an epoxy resin.

15. The wind power installation according to claim 7 wherein the first and second body portions are configured to be coupled together.

16. The wind power installation according to claim 9, wherein the angled bearing surfaces of the inner ring and the outer ring are angled in opposite directions.

* * * * *